May 4 1971    BAKER ET AL    3,577,306

POLYMER LAMINATE TO PREVENT SEVERE METAL PETALLING DAMAGE

Filed Dec. 30, 1968

INVENTORS
RONALD E. BAKER
RICHARD L. COOK
EDWIN C. SLAGEL
BY:
*Oldham & Oldham*
ATTORNEYS

United States Patent Office 3,577,306
Patented May 4, 1971

3,577,306
POLYMER LAMINATE TO PREVENT SEVERE
METAL PETALLING DAMAGE
Ronald E. Baker, Maricopa, Richard L. Cook, Flagstaff, and Edwin C. Slagel, Maricopa, Ariz., assignors to Goodyear Aerospace Corporation, Akron, Ohio
Filed Dec. 30, 1968, Ser. No. 787,716
Int. Cl. B64b 1/14; D03d 11/00
U.S. Cl. 161—90                                    6 Claims

ABSTRACT OF THE DISCLOSURE

A dual layer composite laminate consisting of at least one layer of high strength nylon cloth saturated with a polyurethane and cured to be made semi-flexible with a urethane elastomer pad bonded to one surface of the layer. The other surface of the pad is positioned adjacent the internal surface of metal aircraft skins or other metal structural members to prevent the inward protrusion of the material around a projectile hole through the skin or member so as to prevent petalling of the metal skin into the wound upon the passage of the projectile therethrough.

---

Ballistic penetration of aircraft skins or other structures often results in an inward protrusion of the material around the projectile hole. This protrusion, which is termed "petalling," can pose a considerable threat to effective self-sealing of the adjacent fuel cell wound. This impairment of sealing performance can be caused by direct metal protrusion into the wound or by forcing a mis-match of the skin wall. To overcome this undesirable occurrence, a backing board material has been used in the past to prevent the metal protrusion of the metal skins of fuel tanks in particular. However, while standard backing boards are adequate in some installations, in cases where the aircraft facings or skins are constructed of multi-layer metal composites or metals which promote metal protrusion, such as certain aluminum alloys, or in cases where there is limited or no stand-off space between the fuel tanks and the metal facings or skin, standard backing board materials prove ineffective.

The general object of the invention is to provide an effective backing layer for metal aircraft skins or other metal structural members which will substantially prevent the inward protrusion of the metal of the skin in a petalling fashion on the passing of a projectile or other object therethrough.

The aforesaid object and other objects which will become apparent as the description proceeds are achieved by providing a ballistic laminate for the internal surface of a metal structural skin which comprises at least one layer of nylon fabric, a polyurethane saturating the fabric and cured to provide stiffness thereto, and a urethane elastomer pad bonded to one surface of the fabric layer, with the exposed surface of the elastomer pad positioned adjacent the skin.

For better understanding of the invention reference should be had to the accompanying drawings.

Figure 1:
FIG. 1 is an enlarged cross sectional broken away view of the laminate of the invention positioned adjacent a metal skin member showing only a single layer of woven nylon fabric.

With reference to the form of the invention illustrated in FIG. 1 of the drawings, the numeral 10 indicated generally metal aircraft skin or other metal structure which might be subject to puncture or rupture by a projectile, or other flying metal fragment. Numeral 12 illustrates generally a nylon cloth which has been saturated with a polyurethane resin and cured to have a certain degree of stiffness, which will be more fully defined hereinafter. A urethane elastomer pad 14 is bonded to the inside surface of layer 12 with the composite laminate of layer 12 and pad 14 being attached by bond or mechanical means to the internal surface of skin 10.

Figure 2:
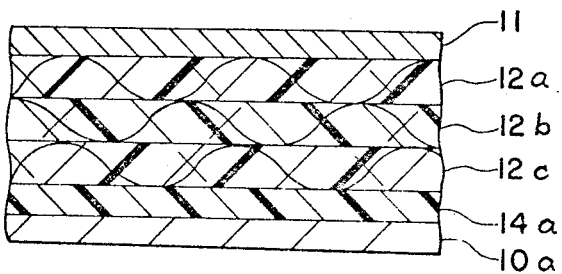
FIG. 2 is an enlarged cross sectional broken away view of a modified embodiment of the invention utilizing a plurality of woven nylon fabric layers.

FIG. 2 illustrates a modified embodiment of the invention with similar components designated by the same numeral with a suffix a added. One distinction in the embodiment of FIG. 2 is that a plurality of thinner gauge or more light weight nylon fabrics are utilized, these being designated as layers 12a, 12b, and 12c, respectively. It has been found that the more nylon layers utilized, the greater the efficiency of the composite laminate becomes, however for aircraft use, of course, where weight is a definite factor, the number of layers must be dictated by weight requirements. A self sealing fuel cell skin is designated by numeral 11. The laminate composite is actually outside the cell skin 11, and not connected to the fuel cell in any manner.

Figure 3:
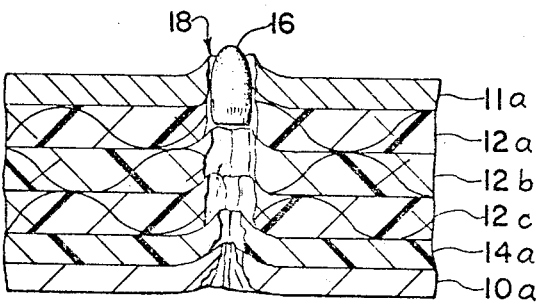
FIG. 3 is an enlarged broken away cross sectional view of the laminate of FIG. 2 showing passing of a projectile therethrough and how petalling is prevented.

FIG. 3 illustrates the performance of the laminate of FIG. 2 upon the passage of a projectile 16 through the laminate forming a hole 18 as illustrated. The metal layer 10a attempts to petal towards the path of the projectile 16 as it passes therethrough, but is substantially prevented from such petalling by the stiff resistance provided by the pad 14a and the nylon layers 12a, 12b, and 12c, is illustrated. The urethane elastomer pad 14a has rugged tear strength capabilities, and hence serves to hold the nylon fabric layers in position adjacent the skin 10a, and also tends in many cases to contain separated skin particles before actual rupture ever is achieved. However, when rupture is achieved, the hole through the composite laminate is very narrow and confined, as is shown by the illustration of FIG. 3.

Figure 4:
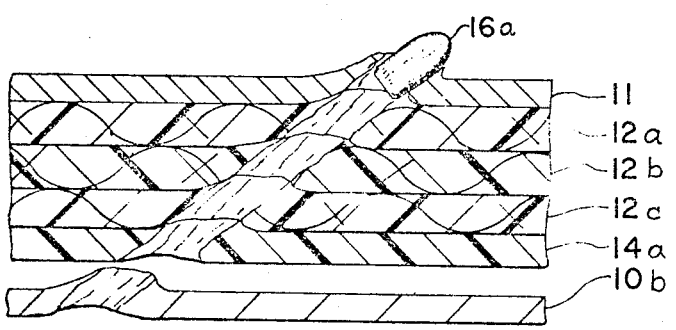
FIG. 4 is an enlarged cross sectional illustration of the embodiment of FIG. 2 with the laminate positioned in a more spaced relationship from the metal skin.

FIG. 4 illustrates the same laminate of FIG. 3 which is positioned at some spaced relationship from a metal skin 10b, and which also will achieve the objects of the invention. This embodiment serves to illustrate that acutal bonding between the laminate composite and the skin is not necessary to achieve the objects of the invention. Also, this figure shows what occurs upon an oblique penetration of the projectile.

The invention contemplates that the nylon cloth should be made in a basketweave and from a high strength nylon filament. Specifically, it is anticipated that the cloth should weigh at least 11.8 ounces per yard, and be formed to the configuration of the tank or the skin. Application of the elastomer pad takes place either before or after formation of the fabric to the desired configuration, and is then cured to the desired configuration. The configuration is important in order to maintain maximum fuel capacity in the fuel cell design which is usually configured to the aircraft structure. By utilizing this configured concept, volume normally needed by standoff protection may be reduced, thus offering more volumetric efficiency in design.

For helicopter and aircraft use, it is anticipated that the nylon cloth layer, whether it be a plurality of layers as shown in FIGS. 2 thru 4 or as a single layer as shown in FIG. 1, should have a thickness of between .030 inch to .075 inch, while the urethane elastomer pad would have a thickness of between .050 inch to .100 inch.

The bonding between the nylon cloth layers and the pad should have low peel strength as delamination layers should occur to prevent the petalling in this type of structure. Specifically, the delamination of the layers at the point of projectile impact, automatically transfers the kinetic energy of the impact over a much greater area of the laminate, thereby providing its effectiveness to reduce petalling damage. The type of elastomer utilized to saturate and stiffen the nylon cloth can be of any of the broad range available in the art, but should be such that stiffness and rigidity are imparted to the cloth upon the curing thereof.

The urethane elastomer pad also can be made from conventionally known materials, but should have critical qualities as follows:

(1) A low temperature brittle point of lower than −100° F.

(2) A high temperature use of +250° F. for up to 30 days without deterioration.

(3) A high tensile strength of 6,000 p.s.i. minimum.

(4) A minimum of 400 split-tear lbs. per lineal inch with the maximum of up to 1,000 lbs. per lineal inch.

(5) The ability to have 350% minimum elongation without failure.

Naturally, the elastomer impregnated nylon cloth should have the same low and high temperature characteristics so as to prevent delamination occurring between these layers at such temperature extremes.

Thus, it should be understood that this laminate will prevent metal petalling into a fuel tank wound, for example, be bridging the petaled wound and forcing the tank wall away from the petals, and also supporting the tank wound in such a manner as to prevent wall mismatch upon projectile penetration. This petalling prevention thus allows those systems currently available for sealing the puncture or hole to operate effectively.

While in accordance with the patent statutes only the best known embodiment of the invention has been illustrated in detail, it is to be particularly understood that the invention is not limited thereto or thereby, but that the inventive scope is defined in the appended claims.

What is claimed is:

1. A laminate comprising a metal structural skin having a ballistic laminate operatively positioned with respect to the internal surface thereof to prevent the inward protrusion of the metal of the skin in a petalling fashion on the passing of a projectile or other object therethrough, said ballistic laminate comprising:

a urethanic elastomer pad operatively positioned with respect to the internal surface of said skin;

at least one layer of high strength woven fabric bonded to said pad by a bond having a low peel strength to permit delamination of the laminate layers to prevent the petalling; and a polyurethane saturating the fabric and cured to provide stiffness thereto.

2. A laminate according to claim 1 where the pad is attached to the skin, and where the fabric layer is made in a basketweave pattern from a high strength nylon filament.

3. A laminate according to claim 2 where there are several layers of fabric bonded together in laminated relation by the polyurethane, and where the fabric layers have a thickness between .030 inch to .075 inch, and the pad has a thickness of between .050 inch to .100 inch.

4. A laminate according to claim 3 where the pad and fabric layers have low temperature brittle points lower than −100° F., and a high temperature capability of +250° F. for up to thirty days without deterioration.

5. A laminate according to claim 3 where the fabric layers are made from a nylon cloth that weighs at least 11.8 ounces per yard, and where the layers are formed to the configuration of the structural skin before the polyurethane is cured to provide stiffness thereto.

6. A laminate according to claim 5 where the urethane elastomer pad has minimum tensile strength of 6,000 p.s.i., minimum split-tear strength of 400 p.s.i., and the ability to stretch up to 350% without failure.

References Cited

UNITED STATES PATENTS

| | | | |
|---|---|---|---|
| 2,744,846 | 5/1956 | Stickles | 2—2.5X |
| 2,748,391 | 6/1956 | Lewis et al. | 2—2.5 |
| 2,816,578 | 12/1957 | Frieder et al. | 139—409 |
| 3,082,611 | 3/1963 | Alvis et al. | 161—159X |
| 3,292,181 | 12/1966 | Kennedy et al. | 2—2.5 |
| 3,486,966 | 12/1969 | Allen et al. | 161—92 |
| 1,364,786 | 1/1921 | Neal | 161—98 |
| 2,451,911 | 10/1948 | Brader | 161—90X |
| 2,697,054 | 12/1954 | Dietz et al. | 161—90X |
| 2,973,293 | 2/1961 | Schofied | 161—98 |
| 3,127,135 | 3/1964 | Burr et al. | 161—98X |
| 3,519,529 | 7/1970 | Cook | 161—404X |

FOREIGN PATENTS

| | | |
|---|---|---|
| 1,043,990 | 9/1966 | Great Britain. |

ROBERT F. BURNETT, Primary Examiner

R. L. MAY, Assistant Examiner

U.S. Cl. X.R.

2—2.5; 109—80; 161—92, 98, 404; 244—121, 126